United States Patent [19]

Malivoir et al.

[11] 4,441,847
[45] Apr. 10, 1984

[54] METHOD AND APPARATUS FOR PRODUCING BUNDLES OF CAST IRON PIPES

[75] Inventors: Roger Malivoir, Pont a Mousson; Gilbert Mayer, Nancy, both of France

[73] Assignee: Pont-a-Mousson SA, Nancy, France

[21] Appl. No.: 441,010

[22] Filed: Nov. 12, 1982

[30] Foreign Application Priority Data

Nov. 20, 1981 [FR] France .................................. 81 21931

[51] Int. Cl.³ ...................... B65B 13/18; B65B 27/10; B66F 9/04

[52] U.S. Cl. ........................................... 414/31; 100/7; 414/45; 414/83; 414/745; 414/786

[58] Field of Search ................. 100/7; 414/31, 83, 45, 414/745, 910, 786, 748

[56] References Cited

U.S. PATENT DOCUMENTS 3,262,246 7/1966 Olsen et al. ......................... 100/7 X
3,880,070 4/1975 Kaplan ............................ 414/745 X
3,941,639 3/1976 Maroschak ......................... 100/7 X
4,003,462 1/1977 Perrott ............................ 414/748 X

FOREIGN PATENT DOCUMENTS 1085886 9/1980 Canada ................................... 414/83
871913 7/1961 United Kingdom ................ 414/748

Primary Examiner—Leslie J. Paperner
Assistant Examiner—Janice Krizek
Attorney, Agent, or Firm—Sughrue, Mion, Zinn, Macpeak and Seas

[57] ABSTRACT

A method and apparatus for bundling beds of pipes using an intermediate cradle, a single removal sled, and a shovel prior to banding. Following delivery of pipe beds to the apparatus by a horizontal conveyor, a shovel repeatedly piles beds of pipes into an intermediate cradle, which subsequently passes the bundles to a removal sled for banding. An intermediate cradle passes obliquely above and below a removal sled to transfer the pipe bundles.

16 Claims, 11 Drawing Figures

Fig.2.
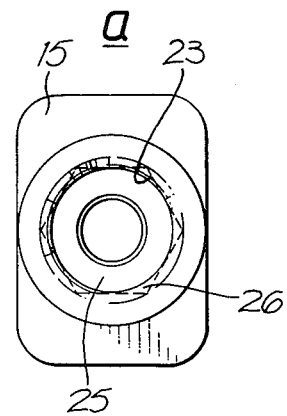
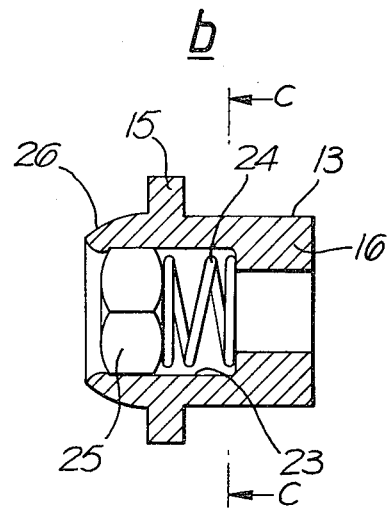
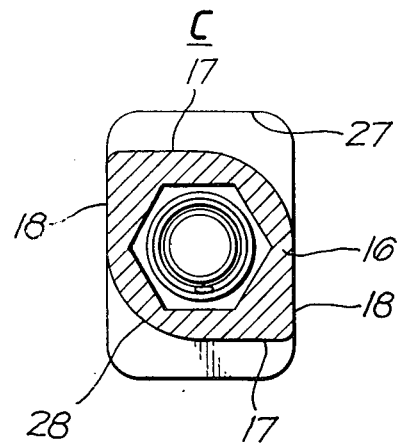
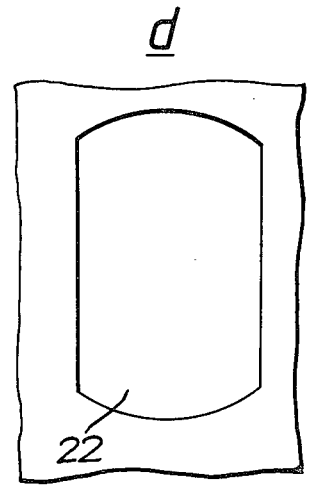

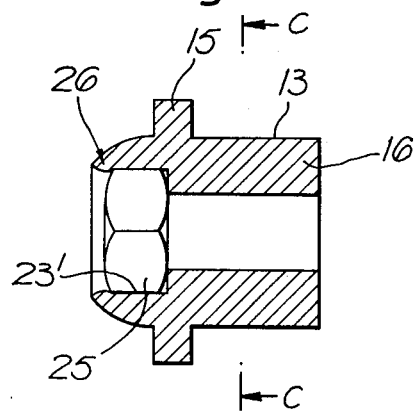
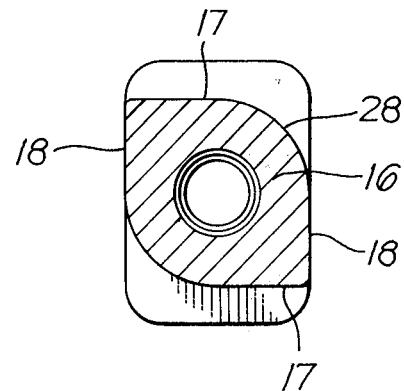
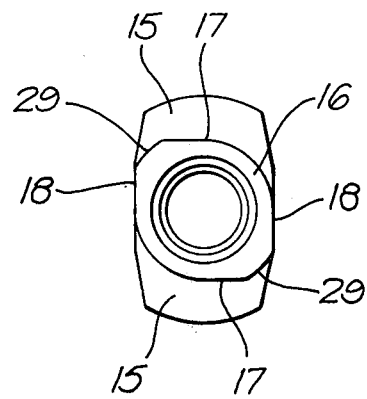

METHOD AND APPARATUS FOR PRODUCING BUNDLES OF CAST IRON PIPES

BACKGROUND OF THE INVENTION

This invention relates to a method and apparatus for arranging on and loading a vehicle with bundles of cast iron pipes arranged head to tail, each bundle comprising an odd or even number of superimposed beds or layers of pipes having the same diameter, and each bed having an odd or even number of pipes.

In such bundles the pipes are arranged head to tail both horizontally on each bed and vertically between superimposed beds, with the female bell joint of one pipe alternating with the smooth male end of an adjacent pipe at each end of the bed. The invention may be applied to pipes having different diameters, for example between 60 and 300 mm, and may be adapted to handle pipes with even greater diameters.

The invention addresses the problem of rapidly and progressively producing bundles of pipes as they are brought onto a horizontal transporter in successive beds separated by brief interruptions on the order of 2 to 3 seconds, the pipes arriving from a manufacturing facility at a rapid rate which varies depending on their diameters, for example 400 per hour for 150 mm diameter pipes.

More specifically, the problem addressed by the invention is to pile up, without wasting time, successive beds of pipe, and to bundle them and place them on a single removal carriage located at the end of a horizontal pipe-bed transporter. Further, since a minimum amount of space should be taken up on the ground, it is desirable that this be done without using a turntable of carriages each in turn serving to receive its bed of pipes at a loading station at the end of the horizontal transporter, and without using a pair of bundle removal carriages, one of which would be loading while the other was unloading its pipes for the placing and tightening of bundle bands thereon. It can be further imagined that direct loading of a single removal carriage with piled pipes to be banded into bundles would be too slow in view of the fact that while the single removal carriage is moving away, pipes awaiting loading would already be at the end of the horizontal transporter.

SUMMARY OF THE INVENTION

The present invention attempts to solve these problems by providing a movable intermediate cradle for receiving a pile of pipe beds awaiting loading onto a carriage for removal to a bundle banding station and to exit. In one embodiment of the invention, the intermediate cradle is located above the position of the removal carriage while it is at the loading station.

In accordance with the invention, the carriage for removing the bundles of pipe, which moves transversely back and forth in relation to the horizontal pipe-bed transporter and which passes through a banding machine of a known type, in order to bring thereto bundles to be banded, is composed of a sled carried by sets of motorized rollers with fixed axes. This sled has back supports for the pipe stocks.

The intermediate cradle is disposed to underlie the sled in the position for the transfer of its load of pipes. For this purpose, the intermediate cradle is composed of a pair of rigid, bent, parallel arms, forming three sides of a quadrilateral, and roughly imitating human arms in a position for supporting a cumbersome packet with arm, forearm and hand forming back support for pipe stocks.

To ensure the stability of the pipe beds and their stacking, the support planes on both the intermediate cradle and the removal sled are oblique.

By means of the invention, the loading of beds of bundled pipe can take place between the horizontal pipe-bed transporter and the intermediate cradle without stopping for the coming and going of the loading means even when the pipe bundle removal sled is distant from the loading station, for example when it is at the banding machine station.

In addition, due to the projections of the pipe bell joints in relation to the back support on the intermediate cradle and on the sled, a problem arises with the collision of the pipe bell joints and the back supports of the intermediate cradle when the pipes are loaded on the sled which removes them. In effect, simple vertical descent of the intermediate cradle beneath the sled to transfer the bundle of pipes from the intermediate cradle to the sled does not allow the back supports of the intermediate cradle to retract from the path of the joints during the transverse movement of the removal sled.

In order to avoid such collision, the invention provides for mobility in the height of the intermediate cradle relative to the removal sled in accordance with a direction which is oblique in relation to the vertical axis.

Due to this obliqueness, when the intermediate cradle is lowered beneath the transversal sled to discharge its bundle of pipes on the same, it moves its own back supports away from the line of passage of the pipe joints during the removal of the sled.

Moreover, in order to transfer the beds of pipes from the horizontal transporter to the intermediate cradle, a shovel with a closed trajectory is provided.

In addition, the problem of passing the sled through the banding machine, without banding together a bundle of pipes and the sled carrying same, is solved by providing that the length of the sled be considerably less than the length of the pipes, and that the bands be placed and tightened by the banding machine around the two ends of the bundles of pipe off the sled.

BRIEF DESCRIPTION OF THE DRAWINGS

FIG. 2 illustrates a bundle of pipes to be obtained;

FIG. 3 is a schematic elevational diagram of an installation of the invention with a bundle of pipes ready to be loaded on a removal carriage;

FIG. 4 is a planar view of the apparatus illustrated in the diagram of FIG. 3;

FIG. 6 is an elevational diagram corresponding to FIG. 3 of the installation during the production of a bundle of pipes;

FIG. 7 is a lateral view in relation to FIG. 3 illustrating the shovel, the cradle and the carriage at the pipe loading station;

FIG. 8 is a schematic planar diagram corresponding to FIG. 7;

DETAILED DESCRIPTION OF THE PREFERRED EMBODIMENTS

Figure 1:
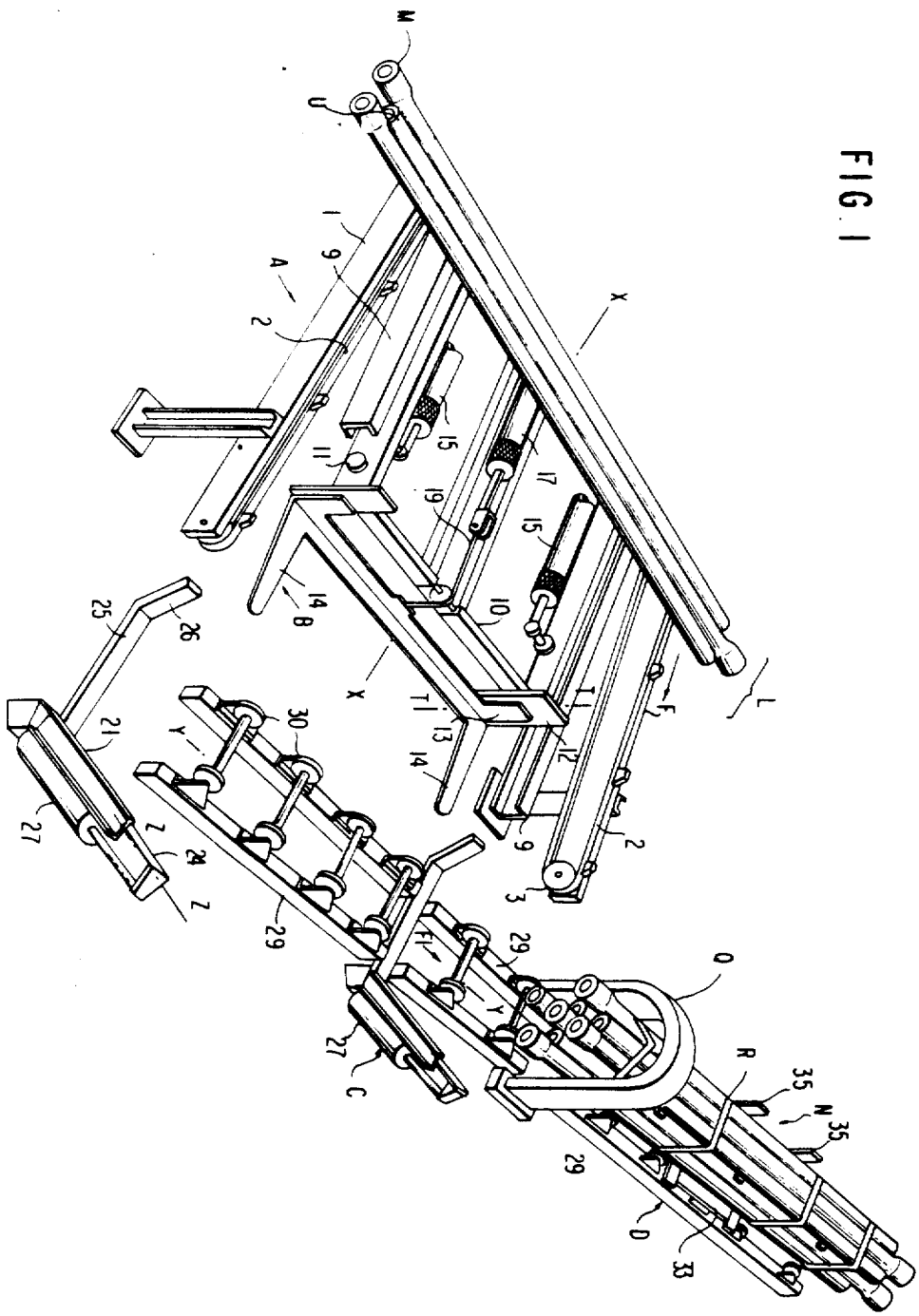

In accordance with the embodiment of FIGS. 1 to 5, the invention is applicable to the production and removal of bundles N of cast iron pipes P, banded with metal or plastic ribbons R by means of a banding machine Q of a known type, which is readily available in commerce, and which is very summarily and schematically shown in FIG. 1.

As shown, the pipes P (FIG. 2) are arranged in superimposed beds L comprising a stack or bundle. Horizontally on each bed L and vertically between two superimposed beds, they are arranged head to tail, a bell joint M of one pipe alternating with a smooth end U of an adjacent pipe to reduce the space taken up by each bundle.

The invention is applicable to the production of bundles of cast iron pipes with pipe diameters ranging, for example, from 60 mm to 300 mm, all the pipes in the same bundle having the same diameter. Each bundle is composed of an odd or even number of beds L of pipes P. Each bed comprises an odd or even number of pipes P.

In the diagram of FIG. 2, each bundle comprises three beds of three pipes having 150 mm diameters. It can further be noticed from FIG. 2 that wedges I composed of wood or other like material are interposed between the beds L with a view to ensure pipe immobilization within the bundle. The wedges I are arranged transversely in relation to the length of the pipes P, which length is, for example, on the order of 6 m.

In all of the drawings, for purposes of simplification, the beds are shown with only three pipes.

One embodiment of the invention comprises a horizontal transporter A (FIG. 3) for delivering beds L of pipes P to a shovel B, a shovel B for loading beds L of pipes P onto a movable intermediate cradle C between the shovel B and a carriage or vehicle or sled D beneath the lower end of the transporter A when it is in the rest position, an intermediate cradle C for receiving the beds L of pipes P for piling them into non-banded bundles of pipe and loading them on a carriage or sled D, and a carriage or sled D for receiving a non-banded bundle of pipes P to remove them from the installation and pass them through a banding or circling machine Q.

The shovel B, the cradle C and the sled D are close in proximity and even overlapped in certain positions inside a rectangular perimeter P' (FIG. 3), thus taking up a minimum amount of space.

The horizontal transporter A has a general direction of movement X-X' (FIG. 4) whereas the sled D has a horizontal direction of movement Y-Y' perpendicular to the direction X-X'.

The shovel B, which may be a hoist, has a raising and lowering direction of movement T-T', which is slightly inclined in relation to the vertical by the angle x and is therefore obliquely oriented in a vertical plane which is parallel to the axis XX' and perpendicular to the axis YY'.

The cradle C is movable in an oblique direction Z-Z' inclined by an angle y (FIG. 3) in relation to the horizontal, the Z-Z' direction or axis being situated in a vertical plane which is parallel to the axis XX' (FIG. 4) and perpendicular to the axis YY'. It is itself inclined by its bearing 25 and support surfaces 26 by the same angle x (FIG. 3) as the shovel B. Angle y is considerably greater than angle x so as to sufficiently separate the cradle C from the sled D during the lowering of cradle C, in order to allow the removal of the non-banded bundles of pipes without colliding with the cradle.

Figure 9:
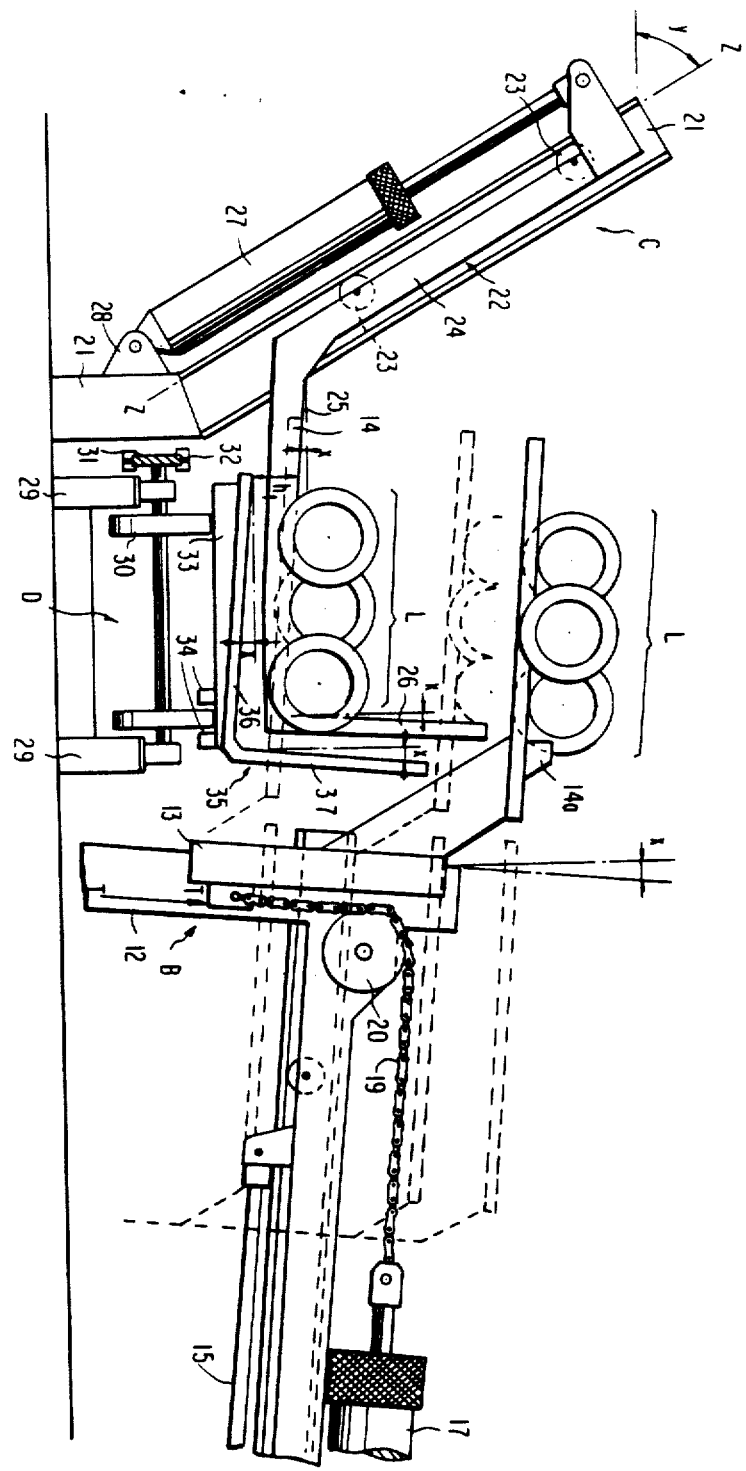
FIG. 9 is a detailed partial schematic view showing the shovel, the cradle and the carriage during the stacking of beds of pipes on the cradle.

The hoist shovel B is movable between a location situated beneath the horizontal transporter A (FIG. 3) and a location situated above the cradle C and the sled D (FIGS. 6 and 9).

Figure 1A:
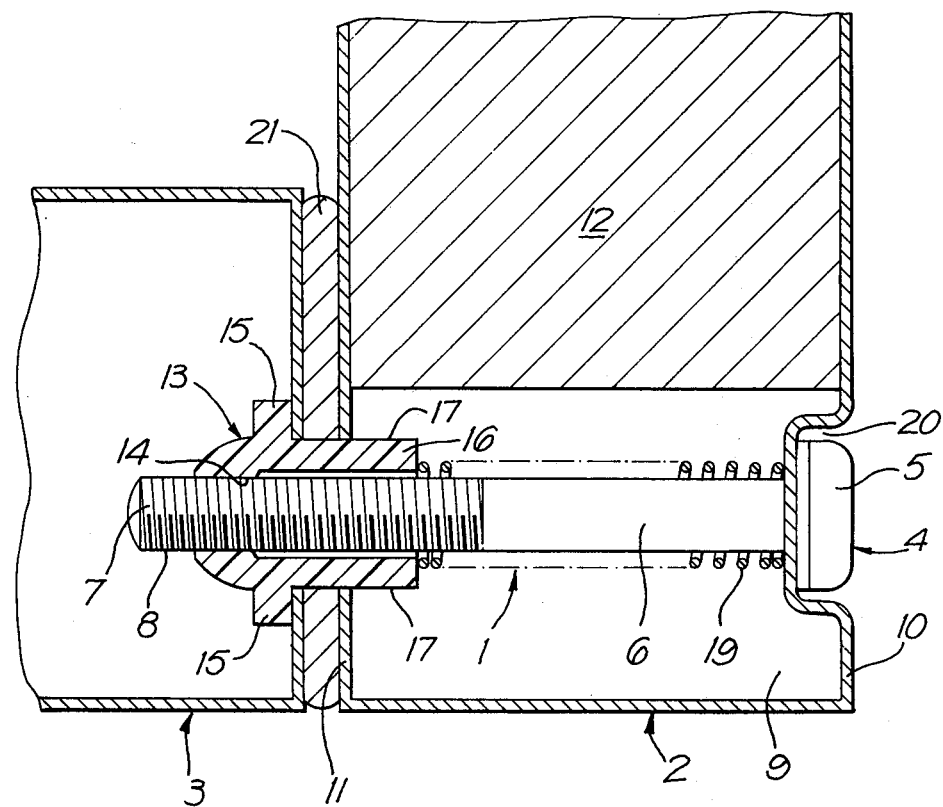
FIG. 1 is a schematic diagram of an apparatus in accordance with the invention.
Figure 1B:
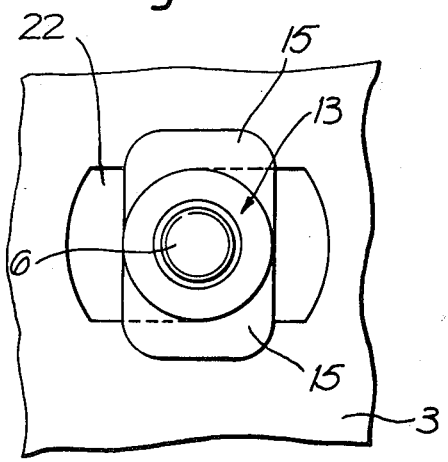
Figure 5:
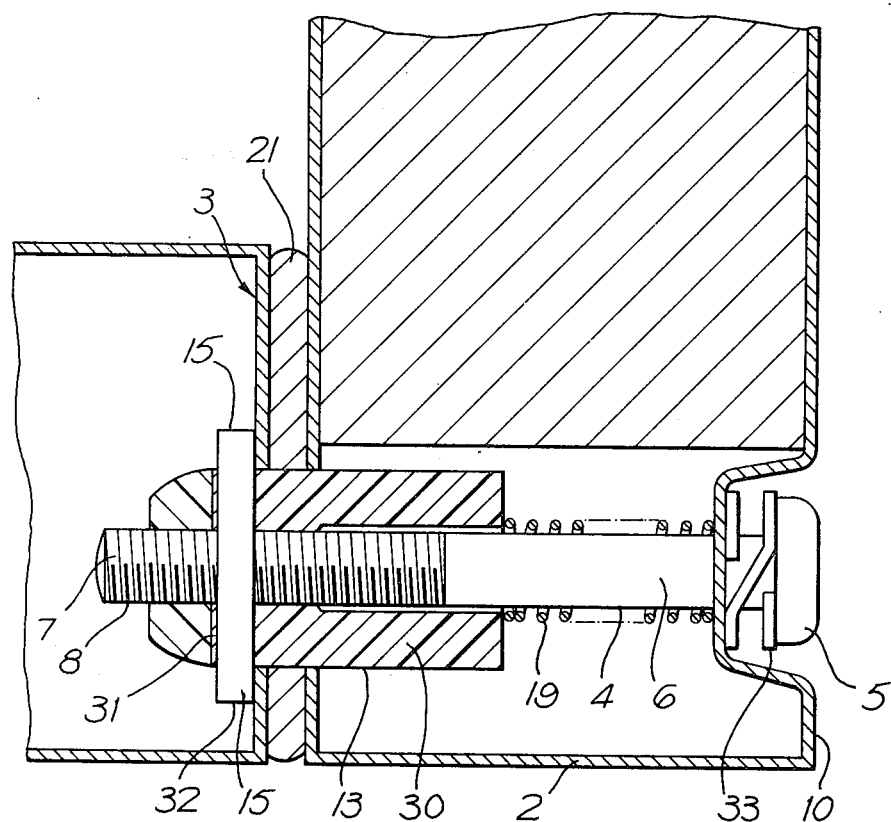
FIG. 5 is an elevational diagram of the removal carriage coming to receive its load of bundled pipes.
Figure 11:
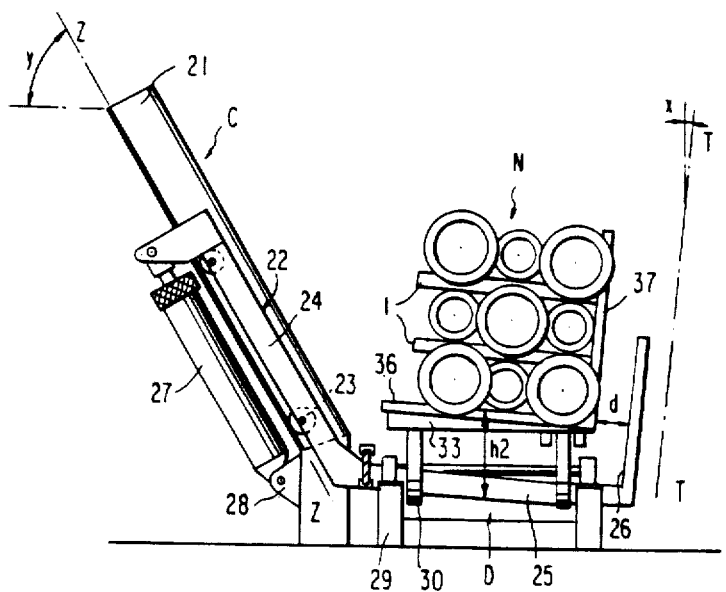
FIG. 11 is an analogous view to FIGS. 9 and 10, corresponding to FIG. 5, illustrating a bundle of pipes loaded on the carriage as well as the cradle in the low position permitting passage for the carriage for its transversal removal.
Figure 10:
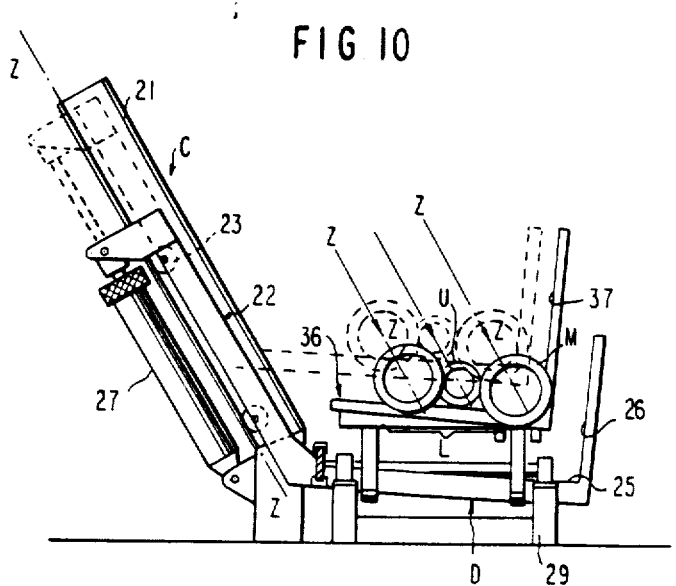
FIG. 10 is a partial schematic view corresponding to FIG. 9, illustrating the oblique trajectory for the transfer of the pipe from the cradle to the carriage during the descent of the cradle.

The cradle C for loading the sled D is movable between a location situated above the sled D (FIGS. 3, 6 and 9) and a location situated beneath the sled D (FIGS. 5, 10 and 11).

The sled D is also inclined by its bearing 36 and support 37 surfaces by the same angle x mentioned above, to stabilize the load of pipes.

With reference to FIGS. 1 and 4, the horizontal transporter A comprises a housing 1 providing as a symmetry plane a vertical plane passing by the horizontal axis XX' which is parallel to the general direction of movement of the transporter A. The housing 1, which is appropriately braced, carries a conveyor 2 composed of a pair of endless chains 2 which are symmetrical in relation to the vertical plane passing by the XX' axis and spaced at a distance which is considerably less than the length of the stock of a pipe P (FIG. 2), that is, the distance is considerably less than the total length of a pipe P shortened by the length of a joint M. The chains 2 of the conveyor pass over toothed end wheels 3 and are continuously driven parallel to the direction X-X', for example at variable speed, in synchronization, by a pair of toothed synchronization wheels 4 (FIG. 4) placed on the same shaft 5 transverse to the direction X-X' and parallel to the general direction of the pipes P laid on the transporter A.

The synchronization wheels 4 are themselves driven by an endless driving chain 6 moved by a variable speed motor 7. The transporter chains 2 are in addition fitted with teeth 8 for driving the pipes P suitably spaced at intervals corresponding to the maximum length of a bed L.

The chains 2 of the conveyor, moving in an appropriate manner, either continuously or by jerks, and, for example, at a variable speed suitably adjusted according to the necessities of loading the pipes, are intended to receive beds of pipes L produced upstream in a known manner which is not shown. These pipe-beds may be produced by laying them individually head to tail by means of a lifting apparatus on the upper side of the chains 2. Each bed L is thereafter pushed in the direction of the cradle C by the teeth 8. Each pipe P situated at the back of each bed is supported by the teeth 8, taking into consideration the forward movement of the transporter A in the direction of the arrow f which is parallel to axis XX' and directed towards the cradle C.

The operation of the hoisting shovel B will now be described with reference to FIGS. 1 and 3 through 9. Shovel B (FIG. 3) is mounted on a frame 9 in tracks parallel to the symmetry plane passing through axis XX' and is located beneath and inside the tracks of the frame 1 of the transporter A with a slight upward slope of an angle x in relation to the horizontal. The tracks 9 therefore rise in the direction of the arrow f for advancing the beds of pipes P along the transporter A. A chassis 10 (FIG. 4) is likely to roll in the tracks 9 forming a rolling track by means of pulleys 11. The chassis 10 supports a frame 12 which is part of the shovel. The frame 12 carries a slide bar for guiding the shovel along the direction T-T' and for raising and lowering the shovel which is slightly sloped by the angle x in relation to the vertical. In the frame 12 a slider 13 may be seated which carries the shovel B, which may be of the fork-lift type. This shovel B may be composed of a pair of bearing arms or palettes 14 spaced at a distance less than the length of the stems of the transported pipes P and less than the spacing of the sliders of the housing 9, and therefore considerably less than the spacing of the chains 2 of the transporter A. The shovel B (FIG. 3) with arms 14 is oriented perpendicularly to the frame 12 and to its slider 13 in accordance with a support plane defined by the arms 14 which therefore make an angle x with the horizontal for stabilizing the load of pipes. In other words, the shovel B is slightly oblique in relation to the horizontal, in the direction going down towards its frame 12. Moreover, the shovel B carries at the end of each of its arms 14, near the frame 12, a pair of teeth 14a positioned on the arms at a point equal to the width of a bed of pipes L. Each arm 14 therefore has a sufficient size to receive a bed L.

The shovel B is capable of moving back and forth along the tracks 9 and of raising and lowering by sliding on the frame 12 so as to transfer a bed L of pipes P on the cradle C and to return to the starting point under the transporter A. For the former purpose, that is, for its movement along the tracks 9, shovel B is moved by a jack 15 positioned on a support 16, whose piston stem end is connected to the chassis 10. For the raising and lowering operations, the stem 13 of shovel B is moved by a jack 17 situated on a support 18 which is connected to chassis 10. The jack 17 has at its piston stem end a traction chain 19 which may be of the Galle chain type, which is fastened to the lower part of the slider 13, after a 90° change of direction around a pulley or toothed wheel 20 on which it passes in accordance with an arc of 90°.

The intermediate cradle for loading sled D, in accordance with the present invention, is composed of a frame 21 (FIG. 9) with two uprights sloped in accordance with the oblique direction Z-Z' making an angle y in relation to the horizontal and acting as rolling tracks with a pair of parallel rigid elbowed supports 22 comprising the cradle and moving in synchronization. The elbowed supports 22 are symmetrical with the symmetry plane passing through axis XX'.

Supports 22 are provided with friction rollers 23 for moving along the frame 21. The synchronization of movement of the elbowed supports 22 may be provided by known hydraulic means which are not shown. The elbowed supports 22 move between an upper position situated above sled D and a lower position situated beneath sled D. The elbowed supports or arms 22 form the three sides of a quadrilateral trapezoidal tray capable of receiving a bundle of pipes and are comparable to human arms bent in a position for supporting a cumbersome packet (FIGS. 3, 5, 6, 9, 10, 11). In effect, supports 22 comprise an oblique side or arm 24, of a height considerably greater than that of transporter A, along the direction Z-Z; supporting rollers 23, and a second side or forearm 25 forming the bearing surface or the seat of the cradle, parallel to tracks 9 of the housing of shovel B and to the arms 14 of said shovel, therefore slightly oblique in accordance with an angle x in relation to the horizontal. Seat 25 has a width at least equal to that of the transverse removal sled D; and a third side or a hand or back support 26 perpendicular to seat 25 and parallel to frame 12, of a height slightly greater than that of transporter A. Back 26 is similarly sloped at an angle x in relation to the vertical.

For raising and lowering the movable cradle C along the oblique housing 21, each elbowed support 22 is moved by a jack 27 fastened at 28 on a support fixed to the ground and connected to the end of the piston stem of jack 27. The two jacks 27 are hydraulically synchronized by a known means which is not illustrated.

The sled D for removal or taking out of the bundles of non-banded pipes will now be discussed. Sled D is an open-bedded vehicle without wheels and is carried by a rolling track with a frame 29 which is horizontal and transverse in relation to direction XX', around a symmetry axis YY' perpendicular to axis XX'. Frame 29 has support rollers 30 with fixed axes which are horizontal and parallel to direction X-X'. A series of motorized rollers 30 form a transverse rolling track for sled D. The motorized rollers 30 are synchronized (FIGS. 7 and 8), for example with toothed wheels 31 and endless Galle chains 32 (summarily illustrated), and driven by motors which are not shown or by any other suitable means.

Due to the series of motorized rollers 30 for support of sled D, sled D is able to move transversely in relation to cradle C in the lower position. Moreover, sled D can pass back and forth through the banding machine Q. This would be impossible if the rollers 30 were themselves borne by sled D which would then be a cart. In that case the automated cart would have to be supplied with energy by, for example, flexible cable which would risk being bound by the banding machine Q.

According to the invention, sled D comprises an open-bed support platform 33 which is carried by the rollers 30 and guided on said rollers by a pair of guiding bars 34 which may be situated on either side of rollers 30, but are intended for one single side of the roller track (FIGS. 3 and 9). Platform 33 (FIG. 9) has on its ends a pair of right-angled braces for supporting and bearing a bundle of pipes, each right-angled brace 35 being sloped by the same angle x as the bearing and support surfaces of shovel B and cradle C. Each right-angled brace 35 therefore contains two sides, one 36 composing the bearing surface or the seat inclined parallel to seat 25 of cradle C, the other side 37 comprising the back support for a bundle of pipes, having the same slope as back 26 of the cradle. Each back 37 is therefore perpendicular to seat 36, parallel to frame 12 and to slider 13 as well as to back 26 of cradle C. Sled D is not only shorter than the spacing between the two arms 14 of shovel B in order to let shovel B raise up and lower outside of sled D, but is also considerably shorter than the interval or distance between the two elbowed supports 22 of cradle C in order also to allow the cradle to raise up and down in relation to sled D (FIG. 8).

Sled D is also of a shorter length than the spacing of the frames 1 of transporter A and consequently, a fortiori, considerably less than the length of the pipes P and therefore than the length of a bundle in order to allow the banding machine Q to tighten the binding around the bundle of pipes outside sled D, on both sides of said sled.

There are two relative height positions between movable cradle C and sled D when said sled is stopped in the loading position at the end of transporter A. The first relative position is that in which cradle C is above sled D, therefore in which seat 25 and back 26 of cradle C are situated inside imaginary surfaces extending from the right-angled braces 35 of sled D. In more descriptive but more summary terms, cradle C is then somewhat enveloped by the silhouette of the right-angled braces 35 of Sled D (FIGS. 3, 6 and 9). The second relative position is that in which cradle C is situated beneath sled D, that is in which the right-angled braces composed of seat 25 and back 26 of cradle C are at the outside of the imaginary surfaces created by prolonging the right-angled braces 35 of sled D or in other words, envelop said braces. It should be noted that in the high position, cradle C is at a height $h_1$ above seat 36 (FIG. 9), and in the low position the cradle is at a height $h_2$ beneath seat 36 of sled D (FIG. 11), these distances being for reasons of limiting the movement of cradle C, and therefore the space taken up.

Sled D moves along the direction Y-Y' between a stop position situated at the end of the transporter and at least two stop positions in front of banding machine Q, that is for laying and tightening the bands or ribbons R (FIG. 1) on the ends of the bundle of pipes P which overlap sled D. It is obviously necessary to avoid attaching the bundle of pipes to sled D. Sled D therefore moves in alternate directions along the transverse track of housing 29 along axis YY'.

The relative spacings between transporter A, shovel B, cradle C and sled D are such that the spacing between the chains 2 carrying pipes P on transporter A, which is considerably less than the length of pipes P, is itself greater than the spacing of the elbowed supports 22 of cradle C which itself is greater than the spacing of the arms 14 of shovel B which itself is greater than the length of sled D and than the spacing of the right-angled braces 35 for supporting pipes P.

The operation of an apparatus according to the present invention will now be described. At the outset, it will be supposed that a bed L of pipes, for example numbering three, arranged head to tail, that is, alternating joint M and male end U, has arrived at the upstream end (in relation to the arrow f) of the horizontal transporter A on the upper sides of the endless chains 2. This bed of pipes L has been laid on transporter A, at the upper end of said transporter, for example by a handling apparatus which is not shown.

Shovel B is then in the lower waiting position beneath transporter A (FIG. 3).

Raising and lowering jack 17 is activated so as to raise shovel B with arms 14 by pulling on chain 19. Shovel B rises, approaches the bed of pipes L, arrives just beneath, continues to rise, raises bed L above transporter A and thus removes it in a support position against teeth 14a of its arms 14. Shovel B then stops rising at the end of the movement of the jack 17, considerably above transporter A.

Cradle C is in the high position, that is, considerably above sled D with a spacing of a height $h_1$ between the seats 25 of the cradle and 36 of the sled, but considerably beneath arms 14 of shovel B in the high position. Shovel B is moved in the direction of cradle C by the forward-backward jacks 15 acting on chassis 10 which rolls on frame 9. Shovel B thus Places itself beyond transporter A just above the transverse rolling track 29 of sled D and just above cradle C. It is the end position of the movement of jacks 15 and chassis 10. Raising-lowering jack 17 is then reversed so as to relax the traction effort on chain 19 and to allow the shovel to descend until the bed L of pipes rests on seat 25 of each elbowed support 22 of cradle C (FIG. 9). Shovel B further continues its descent until the end of the movement of jack 17, then jacks 15 are reversed so as to draw back shovel B out of the space of cradle C to bring it back beneath transporter A (FIG. 3).

It should be noted that after the laying of the second bed L on the first, in cradle C, shovel B can only descend to the level of the first bed without waiting for the low point of the movement of jack 17. Likewise, after the deposit of the third bed L, shovel B can stop its descent at the level of the second bed L. This variation in the movement of descent of shovel B depending on the level of the bed L to be deposited on cradle C may be obtained by known automatic means.

The same back and forth operation of the shovel B between the low and withdrawn waiting and resting position beneath transporter A and the high position above transporter A, first drawn back for removing a bed L of pipes, then advanced above cradle C and lowered to the level of the bed previously deposited on cradle C, then withdrawn again, is repeated as many times, that is three times in the present example, as there are beds L to be loaded on cradle C. Each time that a bed L is deposited on the cradle C, two interposed wedges I, which may comprise wood, are placed on the bed L perpendicular to the stems, so as to protect the cladding of pipes P by avoiding direct contact of their walls between two superimposed beds, and further to immobilize the beds L one in relation to the other, in a future bundle N.

When cradle C contains a complete bundle N of pipes arranged head to tail, that is for example three superimposed beds L of three pipes (FIG. 3), jacks 27 are activated in synchronization so as to lower the elbowed supports 22 of cradle C in accordance with the oblique direction Z-Z'. This lowering of cradle C is carried out while sled D is in a position for receiving a bundle N of pipes at the upstream end of transporter A (FIGS. 10 and 11).

Seats 25 of the elbowed supports 22 draw near seats 36 of sled D, descend to a level lower than that of seats 36 and then deposit during this descent the bundle N on seats 36 of sled D in support against backs 37 (FIGS. 5 and 11).

Cradle C continues to descend until it reaches a lower position situated considerably beneath sled D, for example with a height $h_2$ separating the seats 25 of cradle C from the seats 36 of sled D.

Thus, due to the oblique descent of cradle C in the Z-Z' direction (angle y), the support backs 26 of the elbowed supports 22 of cradle C move away from the back supports 37 of sled D by a distance d and separate considerably from the joints of pipes P whose stems are supported against the backs 37 of sled D (FIGS. 5, 10 and 11). The angle of inclination y in the direction Z-Z' should be sufficient so that a distance d exists which is considerably greater than the space necessary for the passage of joints M, which are protuberances in relation to the backs 37, during the movement of sled D in the direction Y-Y'.

Cradle C being in the lower position, considerably beneath seats 36 of sled D, with a distance d between the backs 26 of C and 37 of D, the way is free for a transverse movement of sled D in the direction of arrow $f_1$ in accordance with the axis Y-Y' (FIGS. 1 and 8), with a view towards removing bundle N of pipes to the banding machine Q on the transverse track composed of rolling track 29 with rollers 30. In effect, the elbowed supports 22 of cradle C are removed from the passage of sled D and its right-angled braces 35 and from the passage of the joints M of the pipes of the bundle N (FIGS. 5 and 11). In particular, it is illustrated that one of the two seats 25 for support 22 of cradle C, that nearest the banding machine Q (to the right on FIG. 8 and following arrow $f_1$), being movable between two pairs of motorized rollers 30 in a groove or an interruption of the housing 29 (FIGS. 1 and 8) in no way acts as an obstacle to this movement of sled D.

As soon as sled D moves out of the way of horizontal transporter A and, more specifically, out of the movement zone of cradle C, cradle C rises to the upper position above the passage of sled D to be loaded with successive pipe beds, even during the moving away of sled D. Cradle C, through activation of jacks 27, therefore again takes up the position of FIG. 9, which, as can be seen, also frees the passageway for sled D to return to the loading position (reverse direction of arrow $f_1$) since seats 25 of cradle C are in the retracted position above seats 36 of sled D and the support backs 26 of cradle C are retracted short of the passage of support backs 37 of sled D returning empty, after having passed through banding machine Q, and having brought a bundle of pipes suitably banded by bands R to dispatch (FIG. 1).

From the preceding description, the following results are shown. First, the production of a bundle of pipes on cradle C, while awaiting loading on sled D, does not stop while sled D is transversely moved away to take a bundle to the machine Q for laying bands R around bundle N. Therefore, wasted time is avoided. Further, with intermediate cradle C alternating between loading shovel B and sled D for removal of the bundles enables one sled D to be used instead of more.

In spite of the restricted space (perimeter P') in which are located shovel B, cradle C and sled D, there is no interference in the movements among the components.

The provision of a removal vehicle in the form of a sled D which is movable on motorized rollers 30 with fixed axes resolves in a simple manner the problem of driving sled D back and forth across the movement zone of cradle C and across the banding machine Q.

The relative spacings of arms 14 of shovel B, of elbowed supports 22 of cradle C and of the right-angled braces 35 of sled D also provide a simple solution to the problem of interferences in the common zones of passage.

The oblique descent in the direction Z-Z' at an angle y of the elbowed supports of cradle C provides, at the same time as the raising or lowering of cradle C above or below sled D, appropriate distancing between the backs 26 for support of cradle C and the backs 37 for support of sled D, which would not be possible if the raising and lowering of cradle C was simply vertical.

The distances traveled are minimal for shovel B, cradle C and sled D.

The apparatus takes up a minimum of space on the ground due to the concentration of shovel B, cradle C and sled D inside a vertical rectangular perimeter P' (shown by the broken line on FIG. 3) located at the end of transporter A.

Further, the installation of the invention operates in a rapid manner due to the concentration of shovel B, cradle C and sled D and the short distances to be covered and the absence of wasted time.

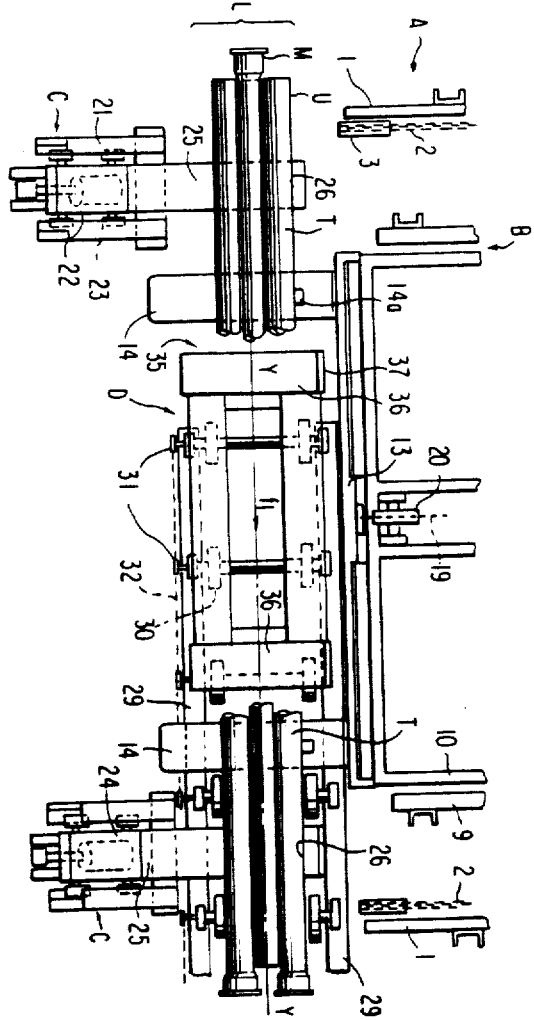

What is claimed is:

1. A method for producing bundles of pipes from horizontal beds of pipes, comprising the following steps:
   transferring horizontal beds (L) of pipes (P) from a horizontal transporter (A) to an intermediate cradle (C) placed above a vehicle (D) for removal of a bundle of pipes, successive beds being stacked into a bundle (N) on the intermediate cradle;
   transferring said bundle of stacked but non-banded pipes from said intermediate cradle to said vehicle for removal of the bundle by lowering said intermediate cradle beneath said removal vehicle which retains the bundle in passing;
   moving said removal vehicle containing said bundle of stacked but non-banded pipes in a direction parallel to the axes of the pipes in said bundle to a means (Q) for banding said bundle; and
   raising said intermediate cradle to a high position for receiving successive new beds of pipes even before the return of the removal vehicle to the position awaiting loading, wherein said intermediate cradle is lowered obliquely in relation to the vertical at an angle of inclination to the vertical which is sufficient to provide a free space (d) between said intermediate cradle and end joints of pipes transferred onto said removal vehicle, thereby enabling the movement of said bundle of pipes on said removal vehicle without collision between said joints and said intermediate cradle.

2. The method of claim 1, wherein each bed of pipes is transferred from said horizontal transporter to said intermediate cradle by moving a loading shovel in accordance with a fixed trajectory or a cycle comprising the steps of raising said loading shovel to grasp a bed of pipes on said horizontal transporter, advancing said loading shovel in the direction of said intermediate cradle, lowering said shovel below said intermediate cradle in order to deposit thereon a bed of pipes, and withdrawing said loading shovel in order to return to a rest position beneath said horizontal transporter.

3. The method of claim 1, wherein said intermediate cradle is loaded with successive beds of pipes at least partially during the absence of the removal vehicle beneath the cradle.

4. An apparatus for producing bundles (N) of pipes (P) from multiple pipe beds (L), comprising: a horizontal transporter (A) for beds of cast iron pipes; and loading means for loading said beds, at one end of said tranporter, onto a removal sled (D) which is movable transversely to the direction of movement of the beds of pipes on said transporter, wherein said loading means for loading said beds comprises shovel means (B) for removing the beds of pipes from the transporter, and an intermediate cradle (C) for receiving the beds of pipes from said shovel means, said intermediate cradle further functioning to transfer said beds of pipe onto said removal sled, said intermediate cradle being movable in height relative to said removal vehicle in an oblique direction between a high position above and a low position beneath said removal sled, wherein said intermediate cradle is movable along a guide path which is oblique at a first actue angle (y) in relation to the horizontal, said guide path being sloped downward in relation to the approach of said intermediate cradle towards said removal sled when said cradle is above said removal vehicle, and upward in relation to said removal sled when said intermediate cradle is beneath said removal vehicle.

5. The apparatus of claim 5, wherein said shovel means for bed-by-bed loading of said intermediate cradle is movable upwards, downwards, forwards and backwards between a position below the end portion of said transporter of beds of pipes and a loading position of said intermediate cradle above said intermediate cradle.

6. The apparatus of claim 6, wherein said shovel means is slightly inclined at a second acute angle (x) to the vertical for supporting a bed of pipes.

7. The apparatus of claim 5, wherein said shovel means comprises a pair of support arms which are oblique in accordance with said second acute angle in relation to the horizontal and supported on a sliding track, and wherein said shovel means is mounted on a carriage under the action of at least one forward-backward jack and is movable on a roller track slightly inclined at said second acute angle in relation to the horizontal beneath said transporter, said carriage comprising a frame which is perpendicular to said carriage, and therefore inclined at said second acute angle in relation to the vertical, and which bears said sliding track in a sliding manner.

8. The apparatus of claim 7, wherein said sliding track of said shovel means bearing said pair of support arms is fastened at the end of a chain for traction in raising-lowering, while the other end of said chain is fixed to the stem of a jack for raising-lowering a shovel member, said jack being mounted on said carriage and said chain changing direction by passage on a quarter of circumference of a pulley means.

9. The apparatus of claim 5, wherein said intermediate cradle is open-bedded and comprises a pair of elbowed, parallel, rigid supports (22) rolling on oblique rolling tracks, said supports each comprising a strongly oblique side (24) parallel to the oblique direction of said rolling tracks, a seat (25) which is slightly oblique in accordance with a second acute angle (x) in relation to the horizontal, and a back support (26) which is perpendicular to said seat and slightly oblique at said second angle in relation to the vertical, said elbowed supports being synchronized in their movements, and wherein said strongly oblique side parallel to the oblique direction of said rolling tracks is at said first acute angle with the horizontal.

10. The apparatus of claim 4, wherein said removal vehicle is an open-bedded sled comprising a horizontal platform (33), and a pair of right-angled braces (35) for supporting a bundle of pipes, and wherein seats (36) and support backs (37) of each brace are slightly inclined at a second acute angle (x) in relation to the horizontal and to the vertical, respectively.

11. The apparatus of claim 10, wherein said removal sled rests on a series of motorized rollers, with axes fixed parallel to the axis of the transporter, such that said removal sled may be driven back and forth in accordance with a direction which is substantially perpendicular to the direction for advancing said pipes on said transporter.

12. The apparatus of claim 10, wherein said first acute angle of inclination of said oblique rolling tracks is notable greater than said second acute angle of inclination of said seats and support backs of said removal sled braces.

13. The apparatus of claim 5, wherein the relative spacings between said transporter, said shovel means, said intermediate cradle and said removal sled are such that the spacing of pipe-bearing chains for advancing said pipes along said horizontal transporter is less than the length of said pipes, and wherein said spacing of said pipe-bearing chains of said horizontal transporter is itself greater than the spacing of elbowed supports of said intermediate cradle, which itself is greater than the spacing of arms of said shovel means, which itself is greater than the length of said removal sled and which is greater than the spacing of right-angled braces for supporting said pipes on said removal sled.

14. The apparatus of claim 5, wherein said intermediate cradle is moved by a pair of jacks (27) appropriately synchronized and applied to elbowed supports (22) of said cradle, said jacks moving said intermediate cradle from a high position situated just above said removal sled to a low position situated below the removal sled.

15. The apparatus of claim 11, wherein said removal sled for removal of bundles of pipes is movable between space containing said intermediate cradle and a position situated beyond a banding means, by passing through said banding means (Q) said bundles of pipes with their ends overhanging said removal sled.

16. The apparatus of claim 11, wherein said motorized rollers supporting said removal sled are carried by a frame comprising a groove in order to provide passage for elbowed supports of said intermediate cradle.

* * * * *

UNITED STATES PATENT AND TRADEMARK OFFICE
CERTIFICATE OF CORRECTION

PATENT NO. : 4,441,847       Page 1 of 8
DATED      : April 10, 1984
INVENTOR(S): Roger Malivoir and Gilbert Mayer It is certified that error appears in the above—identified patent and that said Letters Patent is hereby corrected as shown below:

The title page should be deleted to appear as per attached title page.
Delete drawing sheets 1-4 and substitute the correct drawing sheets 1-6 consisting of Figures 1-11.

*Signed and Sealed this*

*Sixteenth* Day of *April 1985*

[SEAL]

*Attest:*

DONALD J. QUIGG

*Attesting Officer*   *Acting Commissioner of Patents and Trademarks*

United States Patent [19]

Malivoir et al.

[11] 4,441,847
[45] Apr. 10, 1984

[54] METHOD AND APPARATUS FOR PRODUCING BUNDLES OF CAST IRON PIPES

[75] Inventors: Roger Malivoir, Pont a Mousson; Gilbert Mayer, Nancy, both of France

[73] Assignee: Pont-a-Mousson SA, Nancy, France

[21] Appl. No.: 441,010

[22] Filed: Nov. 12, 1982

[30] Foreign Application Priority Data

Nov. 20, 1981 [FR] France .................. 81 21931

[51] Int. Cl.³ .................. B65B 13/18; B65B 27/10; B66F 9/04
[52] U.S. Cl. .................. 414/31; 100/7; 414/45; 414/83; 414/745; 414/786
[58] Field of Search .................. 100/7; 414/31, 83, 45, 414/745, 910, 786, 748

[56] References Cited

U.S. PATENT DOCUMENTS

| | | |
|---|---|---|
| 3,262,246 | 7/1966 | Olsen et al. .................. 100/7 X |
| 3,880,070 | 4/1975 | Kaplan .................. 414/745 X |
| 3,941,639 | 3/1976 | Maroschak .................. 100/7 X |
| 4,003,462 | 1/1977 | Perrott .................. 414/748 X |

FOREIGN PATENT DOCUMENTS

| | | | |
|---|---|---|---|
| 1085886 | 9/1980 | Canada .................. | 414/83 |
| 871913 | 7/1961 | United Kingdom .................. | 414/748 |

*Primary Examiner*—Leslie J. Paperner
*Assistant Examiner*—Janice Krizek
*Attorney, Agent, or Firm*—Sughrue, Mion, Zinn, Macpeak and Seas

[57] ABSTRACT

A method and apparatus for bundling beds of pipes using an intermediate cradle, a single removal sled, and a shovel prior to banding. Following delivery of pipe beds to the apparatus by a horizontal conveyor, a shovel repeatedly piles beds of pipes into an intermediate cradle, which subsequently passes the bundles to a removal sled for banding. An intermediate cradle passes obliquely above and below a removal sled to transfer the pipe bundles.

16 Claims, 11 Drawing Figures

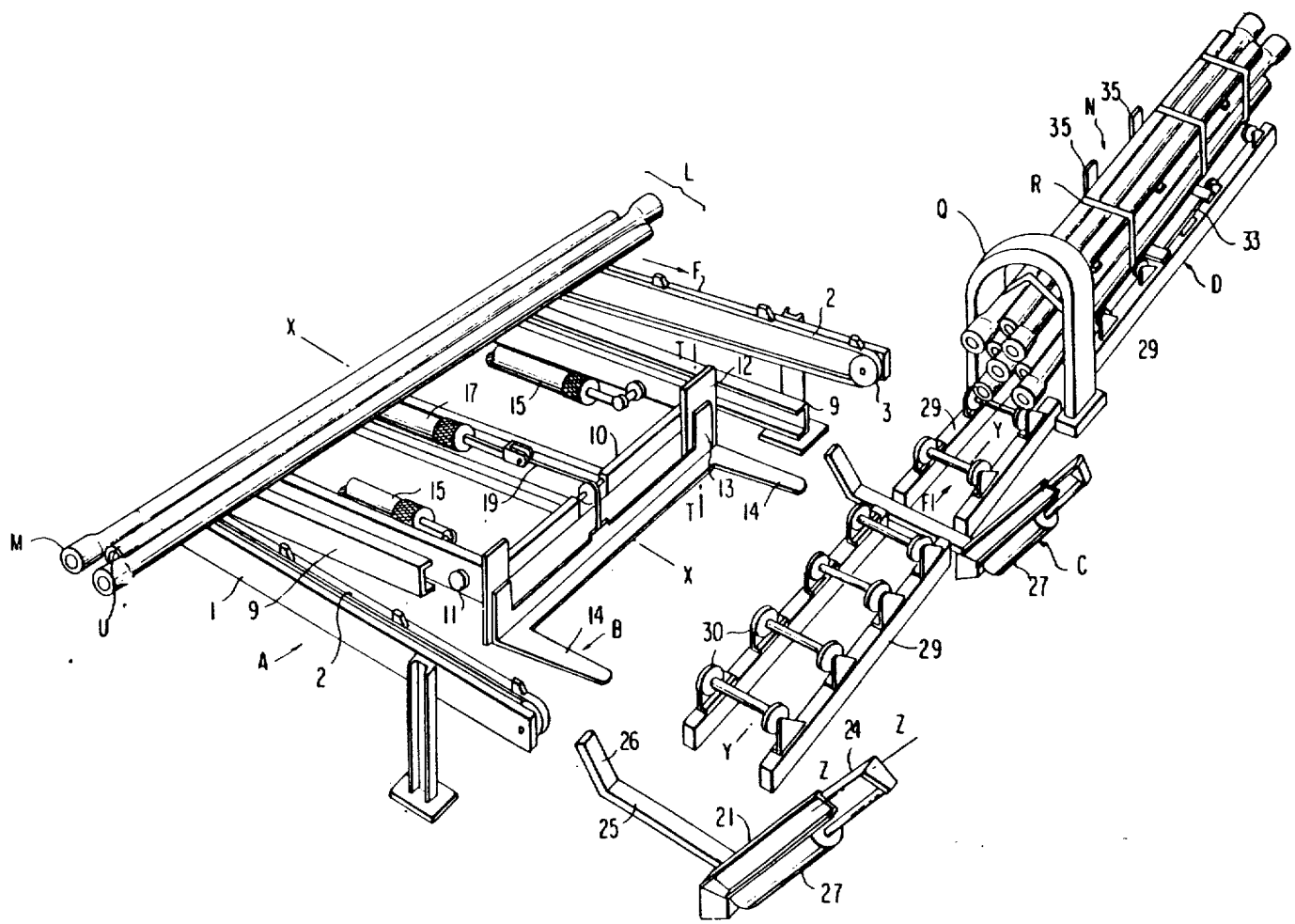

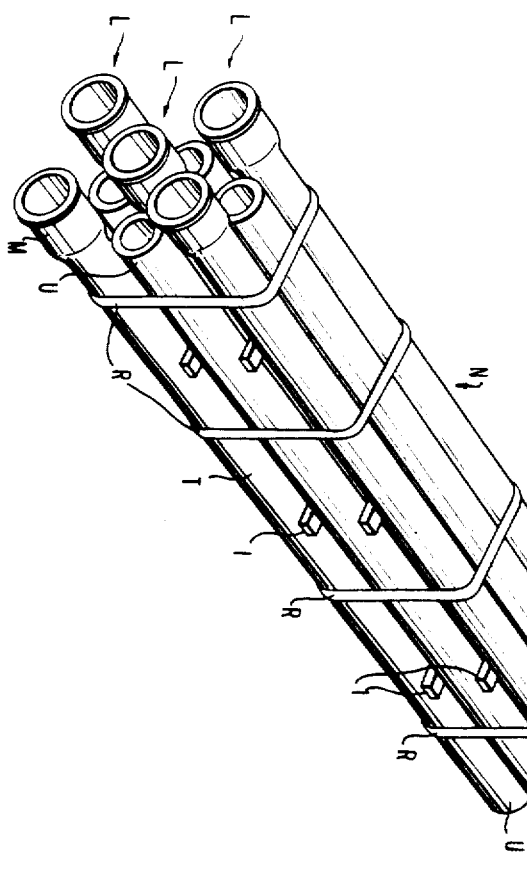
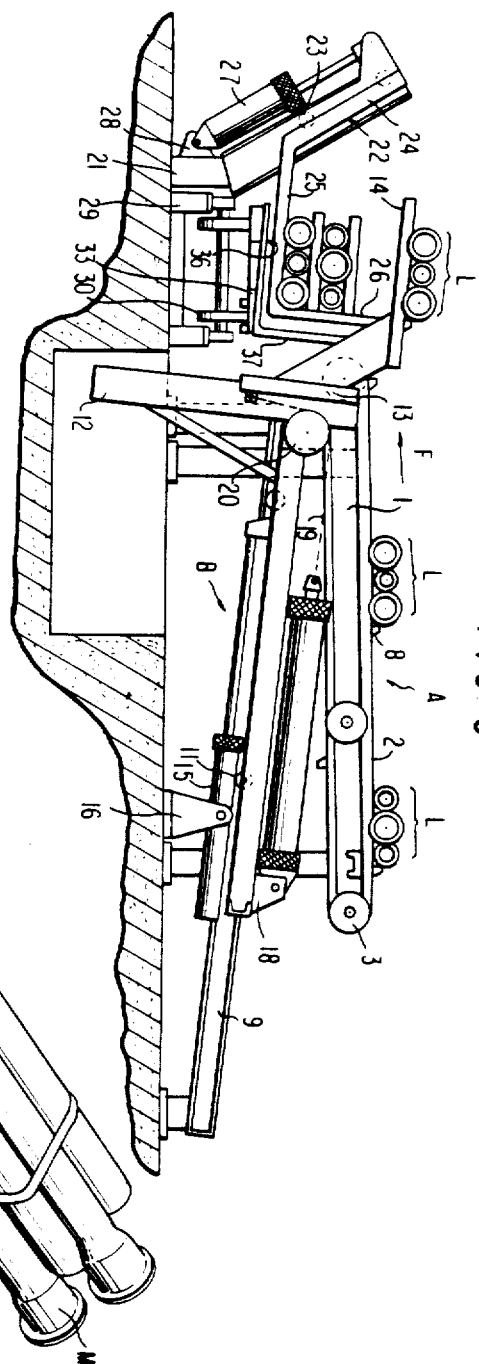
FIG 2
FIG 6

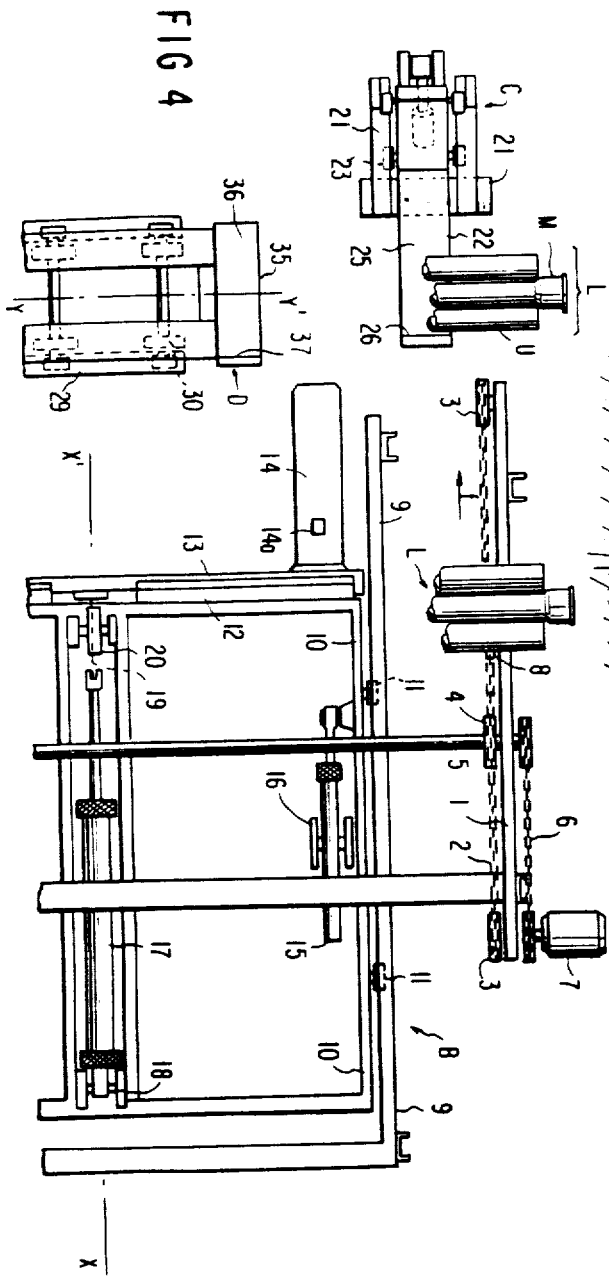
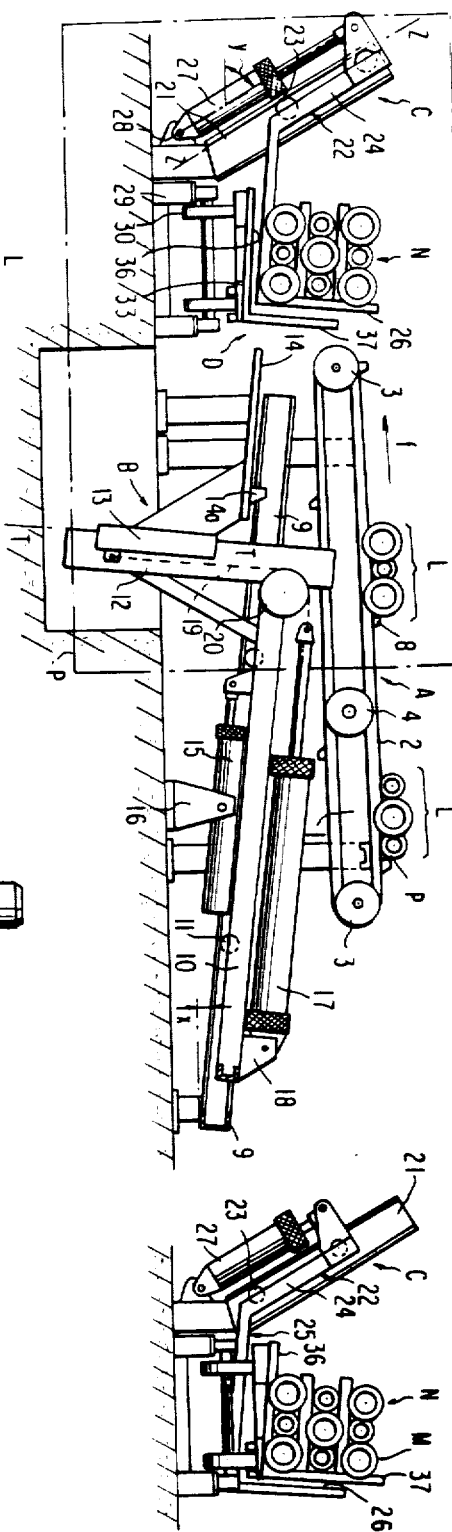
FIG 4
FIG 3
FIG 5